(12) United States Patent
Nimegeers et al.

(10) Patent No.: US 11,505,414 B2
(45) Date of Patent: Nov. 22, 2022

(54) CONVEYER POSITIONING SYSTEM AND METHOD

(71) Applicant: AG GROWTH INTERNATIONAL INC., Winnipeg (CA)

(72) Inventors: Craig Nimegeers, Winnipeg (CA); Zachary Johnson, Winnipeg (CA); Chris Manning, Winnipeg (CA); Vishal Panchasara, Winnipeg (CA); Jorge Viramontes-Perez, Winnipeg (CA); Miguel Angel Romero-Ramirez, Winnipeg (CA); Darcy Cook, Winnipeg (CA)

(73) Assignee: AG GROWTH INTERNATIONAL INC., Winnipeg (CA)

( * ) Notice: Subject to any disclaimer, the term of this patent is extended or adjusted under 35 U.S.C. 154(b) by 8 days.

(21) Appl. No.: 16/514,025

(22) Filed: Jul. 17, 2019

(65) Prior Publication Data

US 2020/0024086 A1 Jan. 23, 2020

Related U.S. Application Data

(60) Provisional application No. 62/699,034, filed on Jul. 17, 2018.

(51) Int. Cl.
*B65G 65/42* (2006.01)
*B65G 43/08* (2006.01)
(Continued)

(52) U.S. Cl.
CPC .............. *B65G 65/42* (2013.01); *B65G 15/24* (2013.01); *B65G 21/14* (2013.01); *B65G 41/002* (2013.01);
(Continued)

(58) Field of Classification Search
CPC .. B65G 65/42; B65G 2201/042; B65G 15/42; B65G 21/14; B65G 41/002;
(Continued)

(56) References Cited

U.S. PATENT DOCUMENTS

| 9,213,905 | B2 * | 12/2015 | Lange | .................. | A01B 79/005 |
| 2015/0287149 | A1 * | 10/2015 | Rosa | ........................ | G01S 19/14 |
| | | | | | 705/7.39 |

(Continued)

FOREIGN PATENT DOCUMENTS

WO 2018074917 A2 4/2018

*Primary Examiner* — Saul Rodriguez
*Assistant Examiner* — Ashley K Romano
(74) *Attorney, Agent, or Firm* — Ware, Fressola, Maguire & Barber LLP

(57) ABSTRACT

A material-conveying system comprising a conveyor for conveying material to a bin and a conveyor positioning system associated with the conveyor. The conveyor positioning system comprises a processor for positioning the conveyor relative to the bin. The conveyor comprises a spout and the bin comprises an opening. The conveyor positioning system positions the spout of the conveyor over the opening of the bin. The conveyor positioning system in one implementation comprises a Global Navigation Satellite System-Real Time Kinematic (GNSS-RTK) positioning system that includes a fixed base station and a GNSS receiver on the conveyor.

19 Claims, 8 Drawing Sheets

(51) Int. Cl.
   *B65G 43/10*   (2006.01)
   *B65G 15/10*   (2006.01)
   *B65G 41/00*   (2006.01)
   *B65G 65/00*   (2006.01)
   *B65G 21/14*   (2006.01)
   *B65G 65/46*   (2006.01)
   *B65G 15/24*   (2006.01)

(52) U.S. Cl.
   CPC .......... *B65G 41/008* (2013.01); *B65G 43/08* (2013.01); *B65G 43/10* (2013.01); *B65G 65/005* (2013.01); *B65G 65/425* (2013.01); *B65G 65/466* (2013.01); *B65G 2201/042* (2013.01)

(58) Field of Classification Search
   CPC ...... B65G 41/008; B65G 43/08; B65G 43/10; B65G 65/005; B65G 65/425; B65G 65/466
   See application file for complete search history.

(56) References Cited

U.S. PATENT DOCUMENTS

| | | | |
|---|---|---|---|
| 2015/0353291 A1* | 12/2015 | Teichrob | B65G 41/008 701/24 |
| 2016/0304300 A1* | 10/2016 | Beaujot | A01B 79/005 |
| 2017/0021318 A1* | 1/2017 | McIver | B65D 88/30 |
| 2017/0121130 A1* | 5/2017 | Bent | A01C 7/081 |
| 2017/0297471 A1* | 10/2017 | Beaujot | A01B 73/00 |
| 2017/0339821 A1 | 11/2017 | Ray | |
| 2018/0000010 A1* | 1/2018 | Zimmerman | B65G 39/04 |
| 2018/0072515 A1* | 3/2018 | D'Agostino | B60P 1/36 |
| 2018/0314261 A1* | 11/2018 | Arandorenko | G05D 1/024 |
| 2019/0003133 A1* | 1/2019 | Tkachenko | E01C 19/004 |
| 2019/0144216 A1* | 5/2019 | Dawson | B65G 65/40 414/289 |
| 2019/0248578 A1* | 8/2019 | Managan, II | B60P 1/00 |
| 2019/0276176 A1* | 9/2019 | Almogy | B65B 25/04 |
| 2020/0130556 A1* | 4/2020 | Weiler | B65G 67/22 |
| 2020/0133271 A1* | 4/2020 | Grun | G05D 1/0248 |

* cited by examiner

CONVEYER POSITIONING SYSTEM AND METHOD

CROSS-REFERENCE TO RELATED APPLICATIONS

This application claims priority from U.S. Provisional Patent Application 62/699,034, filed Jul. 17, 2018.

TECHNICAL FIELD

The present invention relates generally to material-conveying systems and, more particularly, to agricultural material-conveying systems.

BACKGROUND

In the agricultural industry, conveyors or material-conveying systems are used to load grain, seed, fertilizer or other such bulk materials into a storage bin or to offload product from a storage bin.

Aligning a conveyor with a bin, particularly aligning a spout of the conveyor with a bin opening, is difficult and time-consuming and often requires two persons (a spotter and a driver) to perform the alignment. A system to position a conveyor relative to a bin is therefore highly desirable.

SUMMARY

The present invention generally provides a system and method for positioning a conveyor relative to a bin and, more specifically, to position a spout of the conveyor relative to an opening of the bin.

In one inventive aspect of the disclosure, a material-conveying system comprises a conveyor for conveying material to a bin and a conveyor positioning system associated with the conveyor. The conveyor positioning system comprises a processor for positioning the conveyor relative to the bin. The conveyor positioning system positions a spout of the conveyor over an opening of the bin. The conveyor positioning system in one implementation comprises a Global Navigation Satellite System-Real Time Kinematic (GNSS-RTK) positioning system that includes a fixed base station and a GNSS receiver on the conveyor.

In another inventive aspect of the disclosure, a method of positioning a conveyor relative to a bin comprises moving the conveyor to the bin raising the conveyor until the conveyor clears a height of the bin and positioning a spout of the conveyor relative to an opening of the bin. Moving the conveyor to the bin may involve identifying the bin and determining a distance and an angle of approach from the spout of the conveyor to the opening of the bin. Moving the conveyor to the bin may further comprise stopping the conveyor before the conveyor contacts the bin. In various implementations, positioning may be done in a fully automatic mode (with no user control to guide the positioning), a semi-automatic mode (with some limited user input guiding the positioning) or in a user-assisted mode (in which the user primarily guides the position but with some assistance from the system). Automatically or semi-automatically positioning the conveyor may be performed using a GNSS-RTK positioning system. The GNSS-RTK positioning system may also be used for assisted mode as well.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
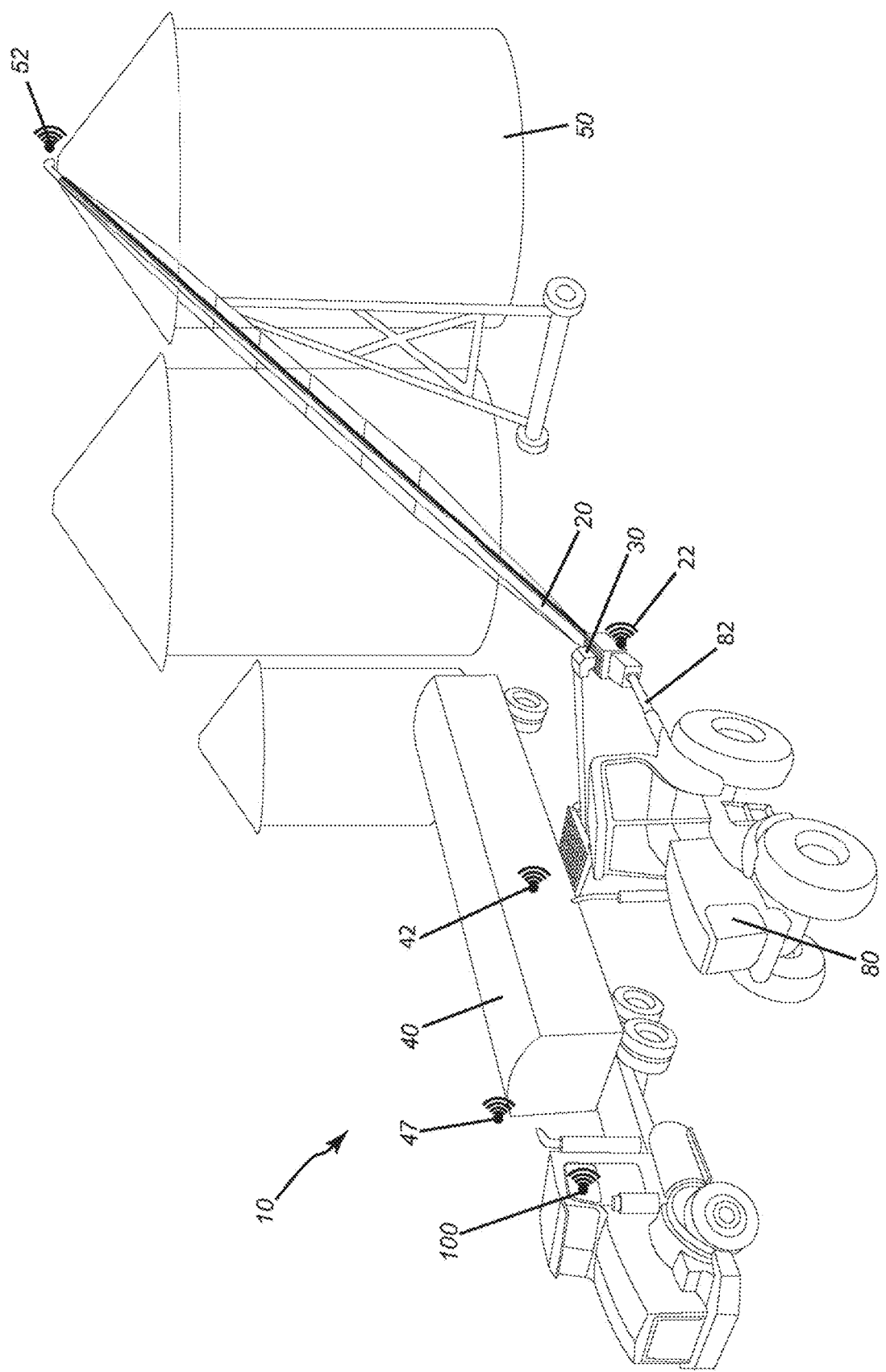
FIG. 1 illustrates a material-conveying system for transferring grain from a truck to a bin.

FIG. 1 depicts a remotely controllable material-conveying system, generally designated by reference numeral 10, in accordance with an embodiment of the present invention. The material-conveying system illustrated by way of example in FIG. 1 is a system for grain handling.

The system 10 depicted by way of example in FIG. 1 includes a main conveyor 20 designed to convey grain, seeds or other bulk material. As shown in FIG. 1, the main conveyor may receive grain from a swing conveyor 30 into which grain is discharged from a truck 40 or other transportable or fixed material container such as a wagon, train car, cart, bin, etc. The grain is conveyed from the swing auger onto the main auger and thereafter into a grain bin 50 or silo for drying, aeration, and storage.

The system 10 may include, in addition to the main conveyor 20 for conveying the material, an electronic control unit and a user interface control panel connected to the electronic control unit to receive user input commands to control the main conveyor and swing conveyor. The system 10 illustrated in this embodiment includes a power unit 80 which is optionally mechanically connected via a PTO driveline or driveshaft 82 to the conveyor for powering the conveyor. The system may also include a data bus connected between the power unit and the electronic control unit. The system 10 may further include a portable remote control device 100 for wirelessly controlling the power output of the power unit to the material-conveying apparatus and optionally also other features of the system. The system 10 may optionally include various wireless sensors and wireless devices such as a wireless interface 22 at the electronic control unit, a wireless gate actuator 42 and a wireless tarp actuator 47 that are controllable by the portable remote control device 100.

A conveyor positioning system may be used to position the conveyor 20 relative to the bin 50. More specifically, the conveyor positioning system may be used to position the spout of the conveyor with the opening of the bin. The conveyor positioning system, in one embodiment, is an automatic system that automatically positions the conveyor relative to the bin. In another embodiment, the conveyor positioning system is a semi-automatic system that receives and uses some positioning input from a user while performing some positioning automatically. In yet another embodiment, the system may be an assisted system in which the user drives the conveyor toward the bin while the system assists the user by providing feedback or corrective positioning, e.g. to avoid collisions or obstacles.

Figure 2:
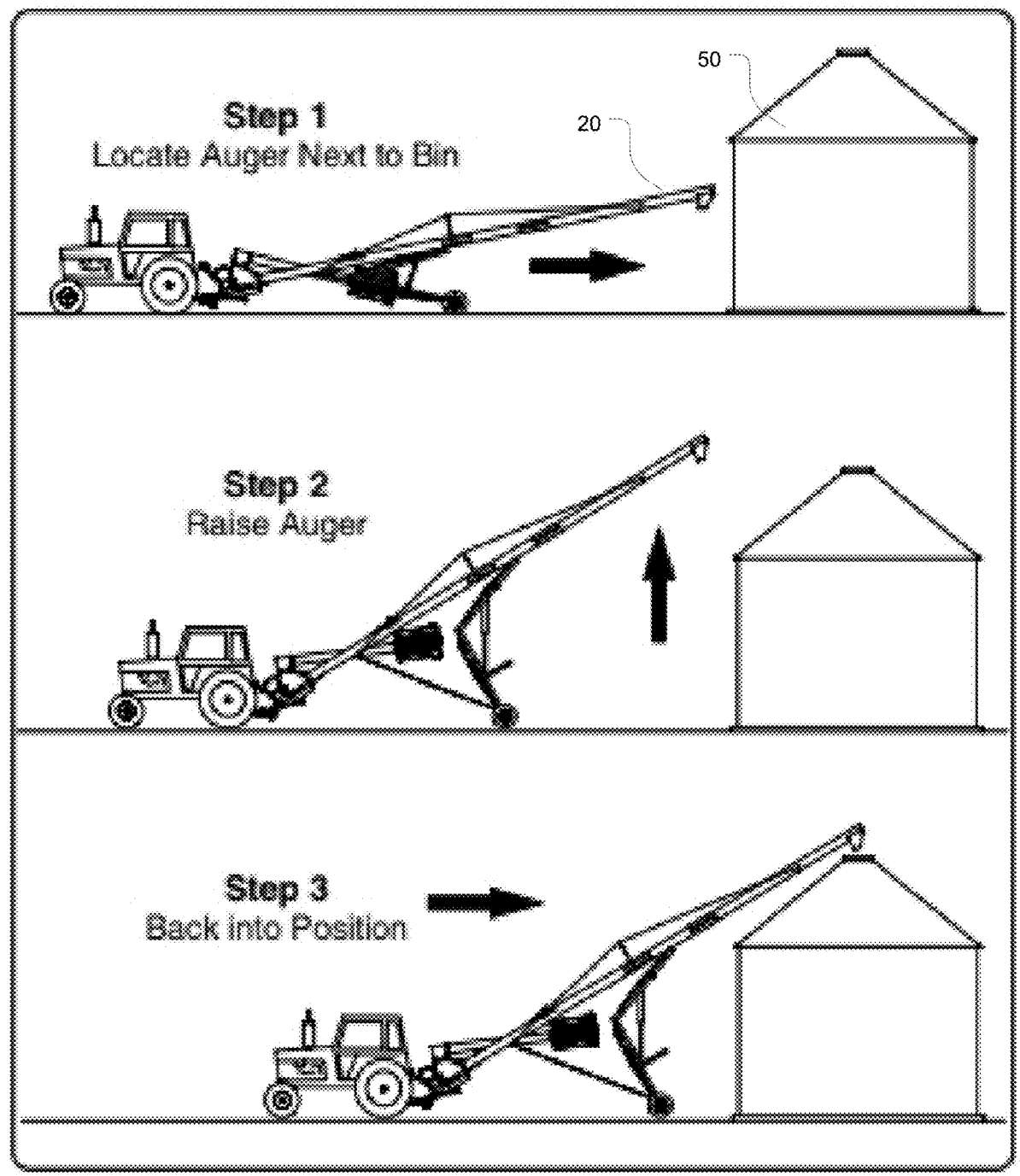
FIG. 2 depicts a method of aligning a conveyor with a bin.

FIG. 2 depicts as an overview of the three main steps of a method of positioning the conveyor 20 relative to the bin 50. In general, the method entails, as shown, locating the conveyor relative to the bin, raising the conveyor 20 to clear the bin 50, and then positioning a spout of the conveyor 20 over the opening of the bin 50. In the example shown in FIG. 2, the conveyor is moved by a tractor which may receive positioning input from the processor. In another implementation, the conveyor 20 has a drive wheel to move on its own, in which case a drive control module of the conveyor receives positioning input from the processor to move the conveyor.

FIGS. 3-7 depict in greater detail the method introduced in FIG. 2. In these figures, the conveyor 20 has a spout 21 to be aligned with an opening 51 of the bin.

Figure 3:
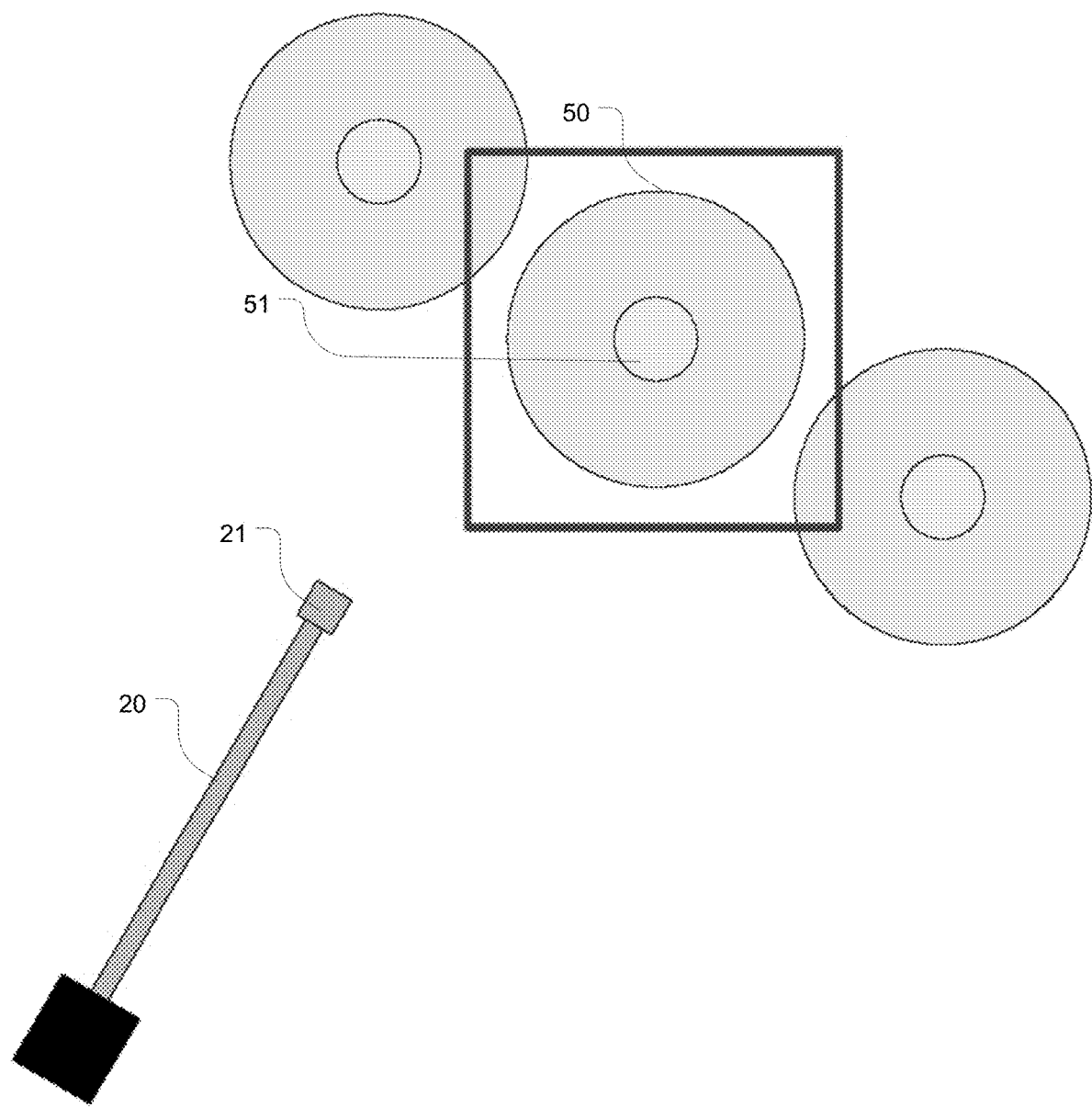
FIG. 3 is a depiction of a first step of identifying the bin.

FIG. 3 depicts a first step of identifying the bin 50. The identification may be done using a map of the bins. A user may select a virtual representation of the bin on a map displayed on a display screen on a mobile device or other computing device. Once the user selects the bin, the mobile device looks up the coordinates of the bin and then sends them to the conveyor positioning system.

Figure 4:
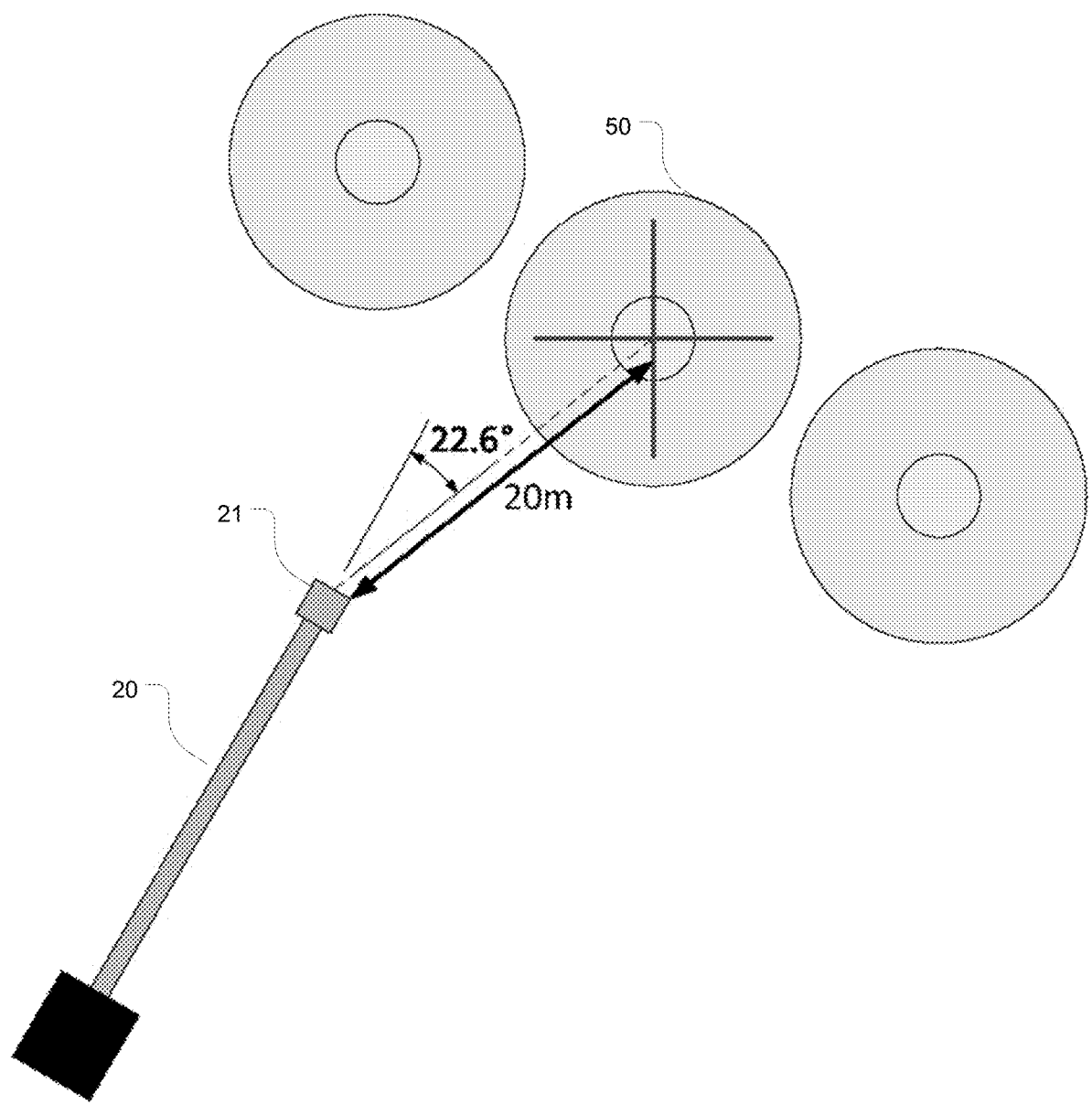
FIG. 4 is a depiction of a second step of determining distance and angle of approach from the spout of the conveyor to the bin opening.

FIG. 4 depicts a second step of determining distance and angle of approach from the spout of the conveyor to the bin opening. Once the locations of the bin and conveyor are determined, the conveyor positioning system computes the distance from the conveyor to the bin as well as the angle of approach. In a specific implementation, the conveyor positioning system determines the distance and angle of approach from the spout of the conveyor to the opening of the bin.

Figure 5:
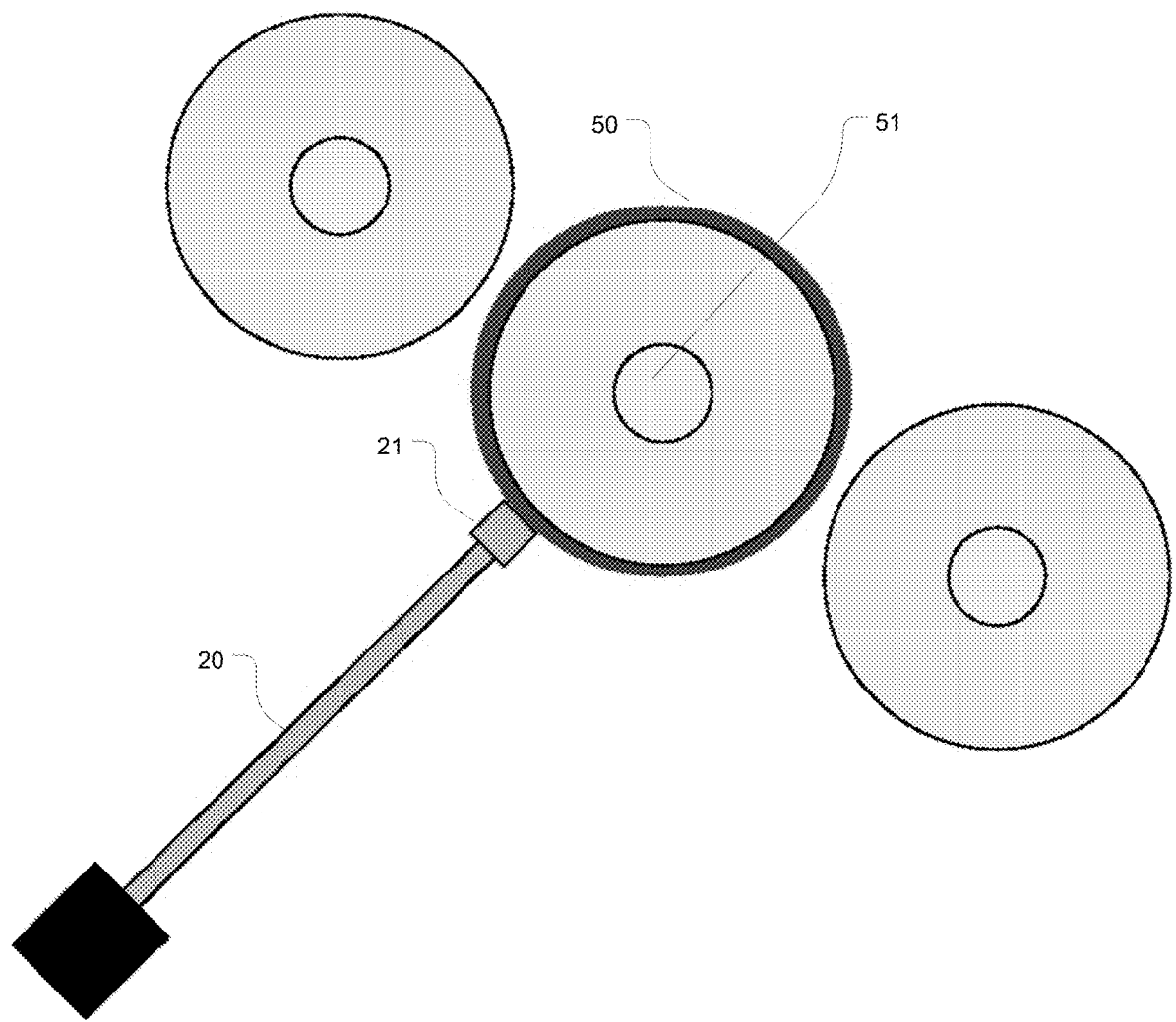
FIG. 5 is a depiction of a third step of stopping the conveyor just before touching the bin.

FIG. 5 depicts a third step of stopping the conveyor just before touching the bin. The conveyor moves toward the bin and then stops just before contacting the bin. A supplemental proximity detection subsystem, e.g. an ultrasonic sensor, may be used to ensure that the conveyor does not accidentally contact the bin.

Figure 6:
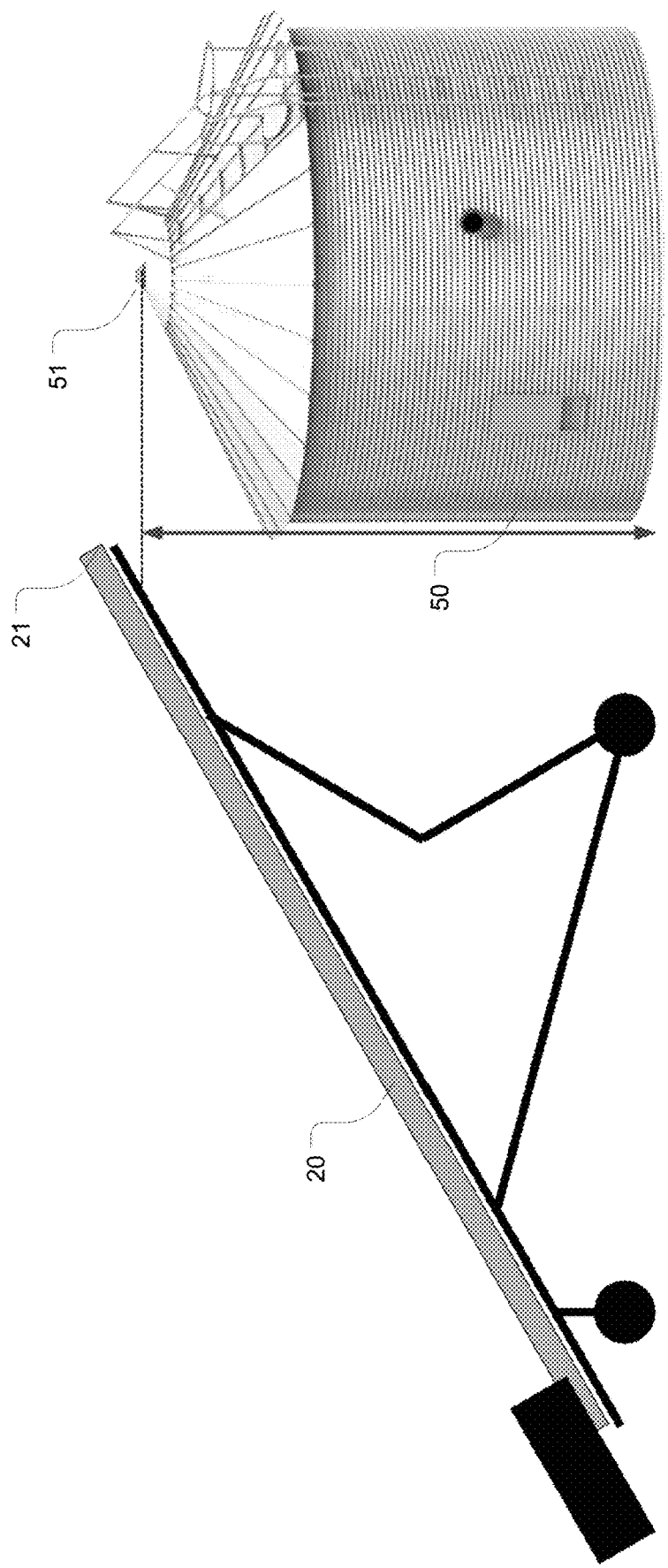
FIG. 6 is a depiction of a fourth step of raising the conveyor until it clears the bin height.

FIG. 6 is a schematic depiction of a fourth step of raising the conveyor 20 until it clears the height of the bin 50. The height of the bin may be sensed and/or retrieved from a memory or database of bin dimensions for the bins in a grain yard.

In a variant, the method may involve raising the conveyor while approaching the bin. In another variant, the method may involve first raising the conveyor and then approaching the bin.

Figure 7:
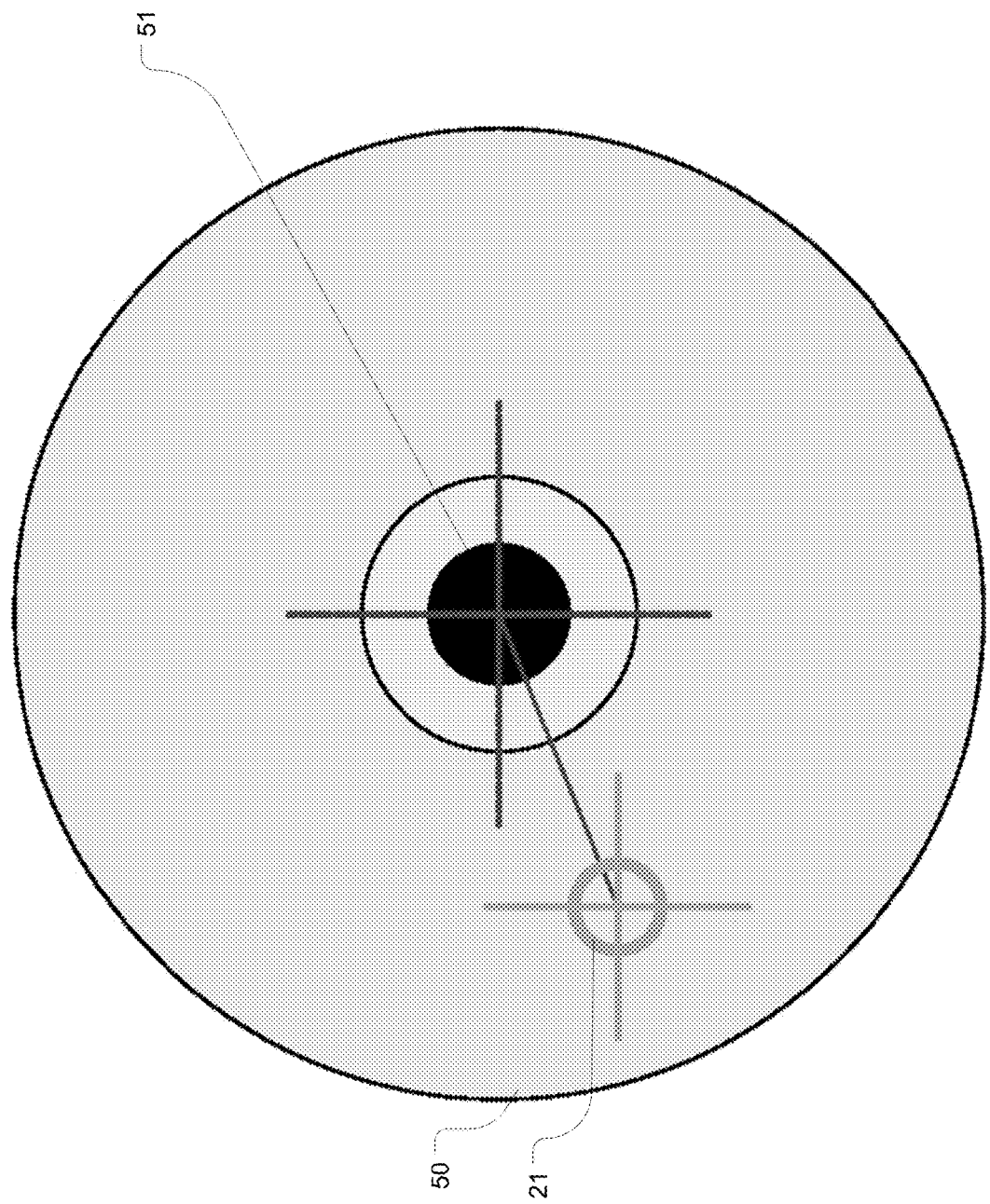
FIG. 7 is a depiction of a fifth step of positioning the spout of the conveyor relative to the opening of the bin.

FIG. 7 is a schematic depiction of a fifth step of positioning the spout of the conveyor relative to the opening of the bin. The positioning may be accomplished using Global Navigation Satellite System-Real Time Kinematic (GNSS-RTK) system or any other suitable positioning system such as those utilizing LIDAR or stereoscopic machine vision. The positioning may be accomplished in two stages: initially positioning to the bin and then, after raising the conveyor, positioning toward the opening.

Figure 8:
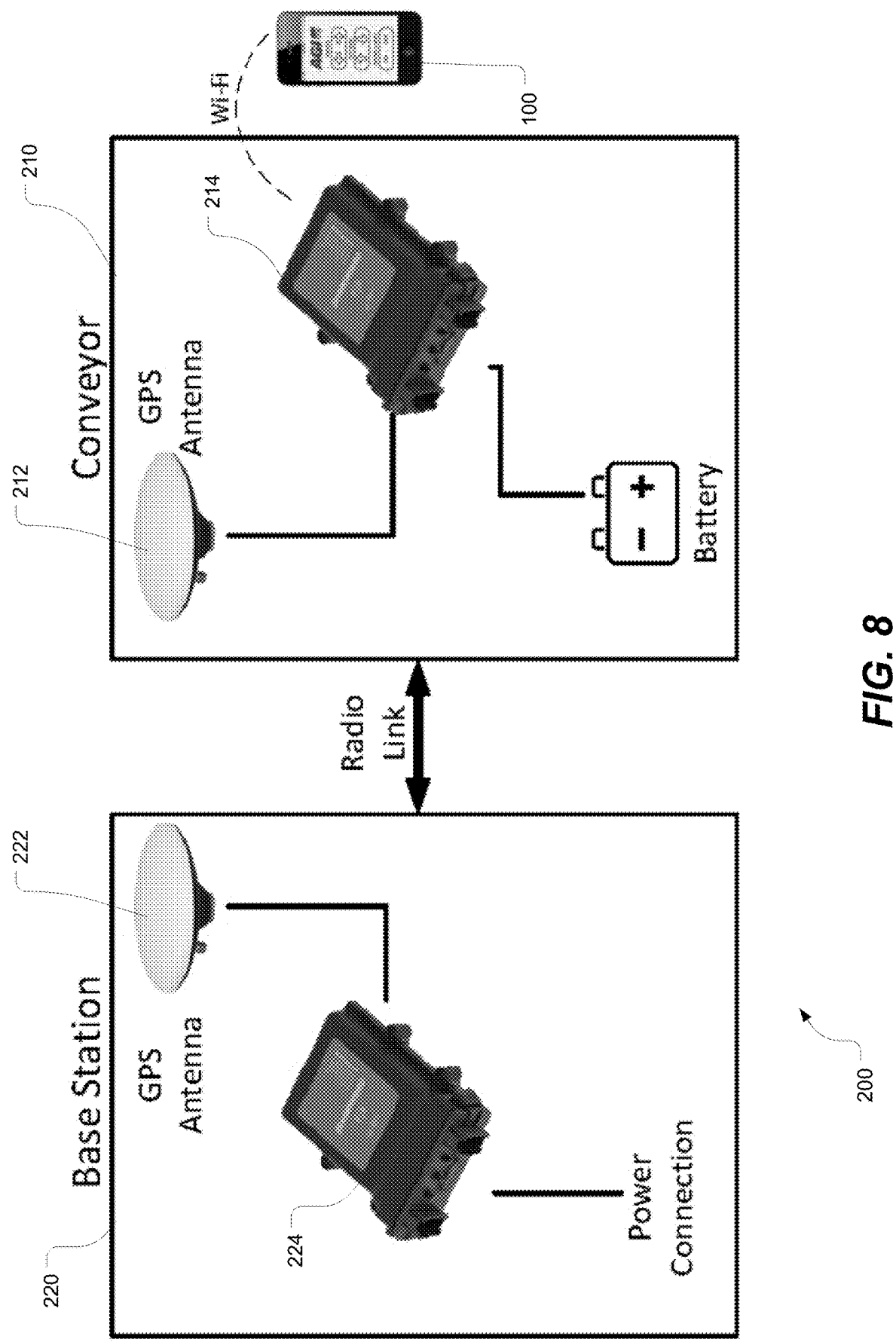
FIG. 8 illustrates a GNSS-RTK system for conveyor positioning in accordance with one embodiment of the present invention.

FIG. 8 illustrates a Global Navigation Satellite System-Real Time Kinematic (GNSS-RTK) system 200 for conveyor positioning in accordance with one embodiment of the present invention. The GNSS-RTK positioning system 200 comprises a conveyor GNSS module 210 and a base station GNSS module 220. The conveyor GNSS module 210 is attached to the conveyor and is thus movable. The base station GNSS module 220 is fixed in space. The conveyor GNSS module 210 has a GNSS receiver 212. The base station GNSS module 220 also has a GNSS receiver 222. The conveyor and base station GNSS modules 210, 220 communicate via a radio link. The conveyor and base station GNSS modules 210, 220 have local data-processing units 214, 224. The local data-processing unit 214 in the conveyor GNSS module 210 communicates via W-Fi (or other equivalent wireless data transmission protocol) with a mobile device 100 or any other suitable portable remote control device. One or both of the local data-processing units 214, 224 may act as the processor of the conveyor positioning system 200. In another embodiment, a separate processor can be provided to communicate with the local data-processing units 214, 224. The processor receives location coordinates of the conveyor and of the bin and computes the distance and angle of approach to the bin opening. The processor outputs drive signals to the conveyor to move the conveyor to the bin, outputs elevation signals to raise the conveyor and then outputs further drive signals to move the spout of the conveyor to the opening of the bin.

This portable remote control device (PRCD) 100 may be any portable, handheld, wearable or mobile device that includes a radiofrequency (RF) transmitter for wirelessly transmitting RF signals to a wireless receiver (or wireless control unit) that is either part of the electronic control unit or connected to the electronic control unit. The PRCD 100 may be implemented as a dedicated handheld controller or implemented in a software application executed by a wireless communications device or mobile device such as a smart phone, tablet, etc. If implemented as a mobile device application, program instructions in code are recorded on a non-transitory computer-readable medium. The computer program instructions are loaded as code into the memory of a mobile device and executed by a processor of the mobile device to cause the mobile device to display user-selectable interface elements (virtual buttons or toggles) representing various commands. In response to receiving user input commands via the user interface (e.g. touch screen display), the code causes the mobile device to interact with a radiofrequency transceiver of the mobile device to wirelessly transmit a command to move the conveyor to a selected bin. Any suitable short-range wireless communication protocol may be utilized for transmitting the commands, e.g. Bluetooth®, ZigBee® RF4CE (Radio Frequency for Consumer Electronics), Wi-Fi™, Z-Wave or equivalent. For example, a ZigBee® RF4CE remote control system compliant with the IEEE 802.15.4 standard operates in the 2.4 GHz frequency band and provides bi-directional communication. Bluetooth® operates in the range of 2400-2483.5 MHz. Line-of-sight control may also be effected using infrared. The remote control device may also operate in the radio frequency band of 27 MHz or 49 MHz which has been allocated by the FCC for basic consumer items.

The mobile device 100 may be paired, registered or linked with the conveyor positioning system 200 to ensure that the mobile device 100 only controls the desired conveyor and not another nearby conveyor by mistake (as multiple conveyors may be used in the same vicinity). The mobile device 100 may be configured to automatically disconnect the link to the conveyor positioning system when the mobile device strays a certain distance from the receiver or after a predetermined period of time. The software application is a computer program embodied as a computer-readable medium that contains, stores, communicates, propagates or transports the program for use by or in connection with the processor or other instruction-execution component of the device. The computer-readable medium may be electronic, magnetic, optical, electromagnetic, infrared or any semiconductor system or device. For example, computer-executable code may be tangibly recorded on a computer-readable medium including, but not limited to, a floppy-disk, a CD-ROM, a DVD, RAM, ROM, EPROM, Flash Memory or any suitable memory card, etc. The software code may be programmed in any suitable language, whether object-oriented or not, e.g. Java, Javascript, PHP, C #, Objective-C, .NET (Visual C++), Perl, Ruby, etc. The method may also be implemented in hardware or firmware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

In another embodiment, the conveyor positioning system 200 may include a stereoscopic camera subsystem (or other equivalent camera or optical sensor subsystem). The processor of the conveyor positioning system 200 receives camera signals and executes a machine vision algorithm to process the camera signals to position the conveyor relative to the bin. The stereoscopic camera subsystem can be used to align the discharge spout with the bin opening. The system can be configured to use positioning input from a user via the mobile device to autonomously move the conveyor into position (e.g. x-y position plus elevation of discharge).

In one embodiment, the system can be configured to use images and signals from cameras or other positioning sensors to enable the conveyor to be folded into transport mode or unfolded into an operating mode (i.e. a bin setup mode). For example, folding the conveyor into the transport mode may entail ensuring that the conveyor is away from any obstructions using a camera or cameras to take images of the surrounding area, lowering the conveyor, moving the swing conveyor and then folding the conveyor into the transport (or stowage) position. In one embodiment, the processor of the conveyor positioning system is configured to generate a conveyor fold signal to fold the conveyor into the transport position.

In one embodiment, the conveyor positioning system includes a memory coupled to the processor for storing a map of obstacles to enable the processor to avoid the obstacles when approaching the bin. In a variant, the user may draw obstacles on a map of a grain yard and/or define a preferred route that the conveyor is to follow when approaching a bin if a direct-line approach is not desired by the user. In a variant, the user may specify an order of bins to fill. In a variant, the mobile device may display which bills are empty or not yet full and then propose to the user bins which bins are available for receiving grain. In a variant, the mobile device may automatically select a bin to fill based on predetermined criteria, e.g. fill status.

In one embodiment, the conveyor positioning system comprises an angle sensor for providing an angle signal to the processor to prevent the conveyor from being inclined too steeply.

The embodiments of the invention described above provide a system and method for positioning a conveyor relative to a bin to facilitate the task of loading grain, seed or other such material into the bin. In different embodiments, the system may operate automatically, semi-automatically or in an assisted mode.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed herein. The scope of the exclusive right sought by the applicant(s) is therefore intended to be limited solely by the appended claims.

The invention claimed is:

1. A material-conveying system comprising:
 a conveyor for conveying material to a bin;
 a conveyor positioning system associated with the conveyor, wherein the conveyor positioning system comprises a processor for positioning the conveyor relative to the bin by computing the distance from the conveyor to the bin as well as the angle of approach to avoid obstacles when approaching the bin, and wherein the processor is also configured to output an elevation signal to raise the conveyor; and
 a mobile device wirelessly connected to the conveyor positioning system, the mobile device having a user interface for receiving user commands defining a preferred route that the conveyor is to follow when approaching the bin, wherein the conveyor positioning system positions the conveyor by displacing the conveyor along the preferred route to the bin.

2. The system of claim 1 wherein the conveyor comprises a spout and wherein the bin comprises an opening, and wherein the conveyor positioning system positions the spout of the conveyor over the opening of the bin.

3. The system of claim 2 wherein the conveyor positioning system comprises a Global Navigation Satellite System-Real Time Kinematic (GNSS-RTK) positioning system that includes a fixed base station and a GNSS receiver on the conveyor.

4. The system of claim 3 wherein the mobile device is wirelessly connected to the GNSS-RTK positioning system, wherein the user interface enables a user to cause the conveyor positioning system to position the spout of the conveyor over the opening of the bin.

5. The system of claim 4 wherein the user interface of the mobile device enables a user to select one of a plurality of bins to approach.

6. The system of claim 1 wherein the processor is configured to generate a conveyor fold signal to fold the conveyor into a transport position or unfold into an operating position.

7. The system of claim 1 wherein the conveyor positioning system comprises a stereoscopic camera subsystem and wherein the processor receives camera signals and executes a machine vision algorithm to process the camera signals to position the conveyor relative to the bin.

8. The system of claim 1 wherein the conveyor positioning system comprises a LIDAR subsystem.

9. The system of claim 1 comprising an angle sensor for providing an angle signal to the processor to prevent the conveyor from being inclined too steeply.

10. The system of claim 1 comprising a memory storing a map of obstacles to enable the processor to avoid the obstacles when approaching the bin.

11. The system of claim 1 wherein the user interface of the mobile device enables the user to draw a further obstacle on a map.

12. A method of positioning a conveyor relative to a bin, the method comprising:
receiving user input via a user interface of a mobile device to define a preferred route that the conveyor is to follow when approaching the bin;
moving the conveyor to the bin by:
receiving the preferred route from the mobile device;
determining a distance and an angle of approach from a spout of the conveyor to an opening of the bin; and
using a map of obstacles stored in a memory to enable the conveyor to avoid the obstacles when approaching the bin;
raising the conveyor until the conveyor clears a height of the bin; and
positioning the spout of the conveyor relative to the opening of the bin by moving the conveyor along the preferred route to the bin.

13. The method of claim 12 wherein moving the conveyor to the bin further comprises stopping the conveyor before the conveyor contacts the bin using a supplemental proximity detection subsystem to prevent the conveyor from accidentally contacting the bin.

14. The method of claim 12 wherein positioning is performed using a GNSS-RTK positioning system.

15. The method of claim 12 wherein positioning is performed using a machine vision subsystem.

16. The method of claim 12 wherein positioning is performed using a LIDAR subsystem.

17. The method of claim 12 comprising generating a conveyor fold signal to fold the conveyor into a transport position or unfold into an operating position.

18. The method of claim 12 comprising generating and sending an angle signal to prevent the conveyor from being inclined too steeply.

19. The method of claim 12 further comprising receiving user input to draw an obstacle on a map displayed on the user interface of the mobile device.

* * * * *